March 7, 1939.　　　J. R. FREI　　　2,149,764

MAGNETIC FILTER

Filed June 10, 1937　　　3 Sheets-Sheet 1

Witness:
Burr W. Jones

INVENTOR.
Jakob Rudolf Frei
BY Clinton S. Janes
ATTORNEY.

March 7, 1939.  J. R. FREI  2,149,764
MAGNETIC FILTER
Filed June 10, 1937  3 Sheets-Sheet 2
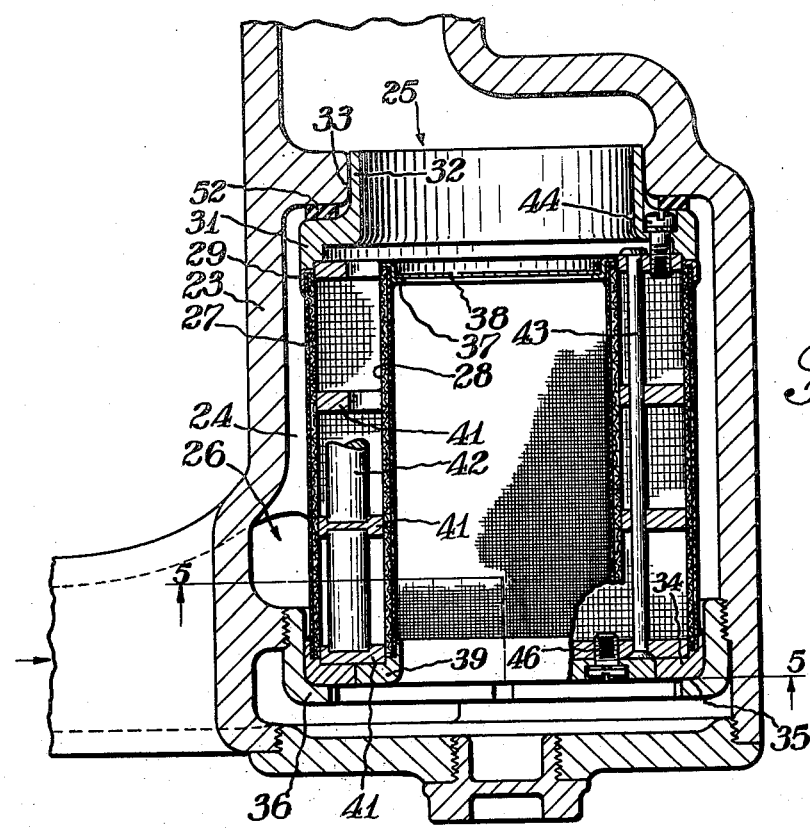
Fig. 4
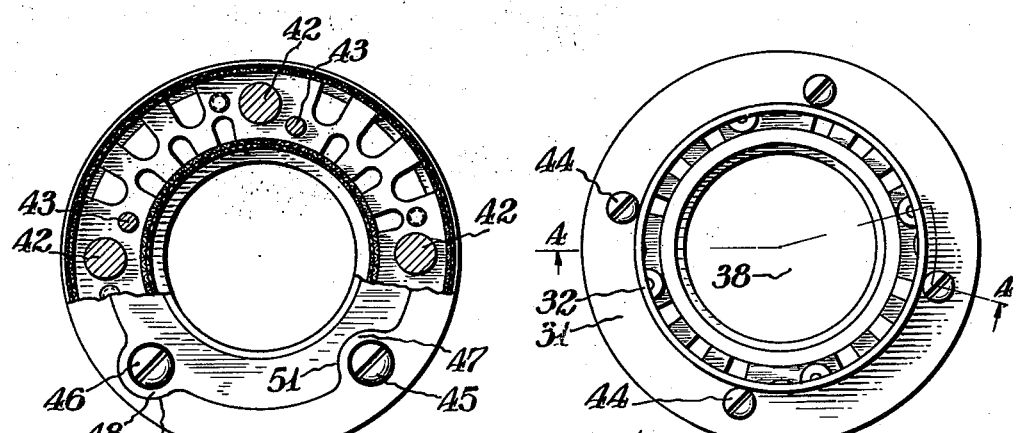
Fig. 5
Fig. 6
Witness:
Burr W. Jones
INVENTOR.
BY Jakob Rudolf Frei
ATTORNEY.

March 7, 1939.　　　J. R. FREI　　　2,149,764
MAGNETIC FILTER
Filed June 10, 1937　　　3 Sheets-Sheet 3

Witness:
Burr W. Jones

INVENTOR.
Jakob Rudolf Frei
BY
Clinton A. Janes
ATTORNEY.

Patented Mar. 7, 1939

2,149,764

UNITED STATES PATENT OFFICE 2,149,764

MAGNETIC FILTER

Jakob Rudolf Frei, Sidney, N. Y., assignor to Bendix Aviation Corporation, South Bend, Ind., a corporation of Delaware Application June 10, 1937, Serial No. 147,533

10 Claims. (Cl. 210—154)

The present invention relates to a magnetic filter and more particularly to a device for separating particles of magnetic material such as iron or steel chips or dust from fluids such as lubricating oil in which such material is suspended.

Various magnetic devices have been proposed from time to time for separating ferrous material suspended in fluids, but such devices have in general been large and cumbersome in comparison with the corresponding conventional filter units, and have been found inefficient when the flow of fluid therethrough was rapid. They also have been in general difficult to clean and maintain at their maximum effectiveness.

It is an object of the present invention to provide a novel magnetic filtering device which is efficient and thorough in its action, while being small and compact in construction.

Another object is to provide such a device which may be readily disassembled for cleaning.

A further object is to provide such a device which is so arranged that in reassembly of the parts, proper correlation thereof is assured.

Further objects and advantages will be apparent from the following description taken in connection with the accompanying drawings in which:

Fig. 4 is a vertical sectional view of a second embodiment of the invention involving a more compact arrangement of the filter, taken substantially on the line 4—4 of Fig. 6;

Fig. 5 is a section of the filter unit taken substantially on the line 5—5 of Fig. 4;

Fig. 6 is a top end view of the filter unit;

Figure 1:
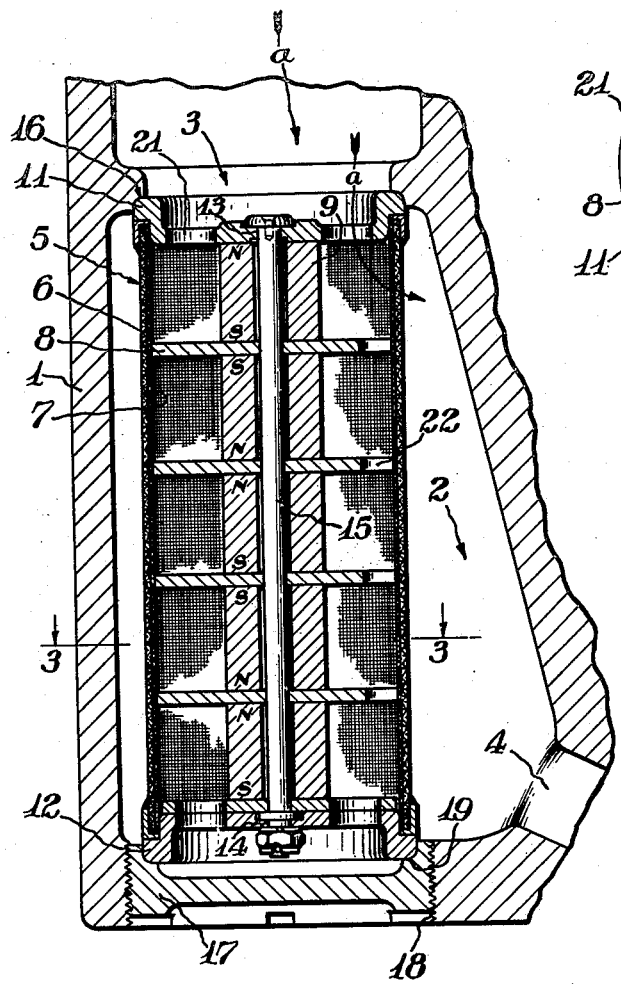
Fig. 1 is a vertical sectional view of a preferred embodiment of the invention taken substantially on the line 1—1 of Fig. 3.
Figure 2:
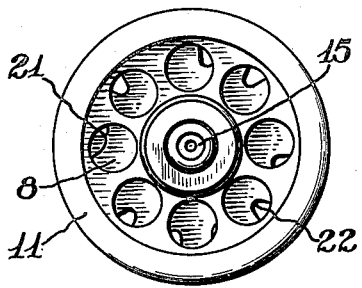
Fig. 2 is a top end view of the filter unit.
Figure 3:
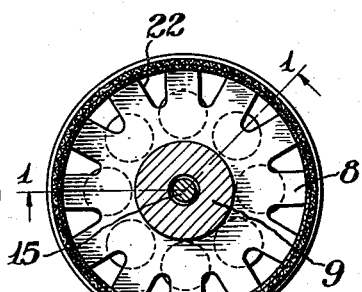
Fig. 3 is a cross section taken substantially on the line 3—3 of Fig. 1.
Figure 7:
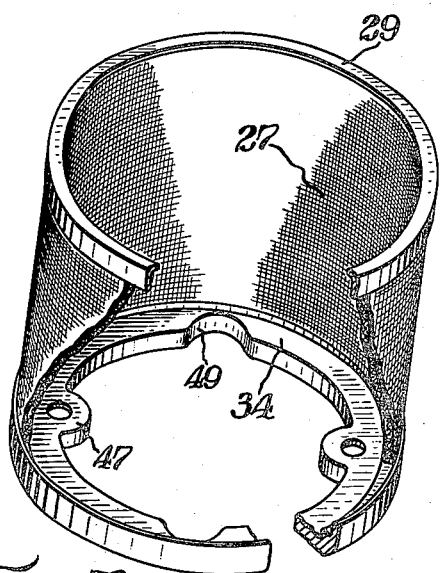
Fig. 7 is a detail in perspective partly broken away of the outer filtering element of the structure illustrated in Fig. 4.
Figure 9:
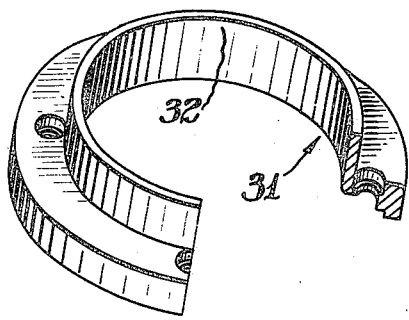
Fig. 9 is a similar view of the upper mounting collar for the filter unit.
Figure 8:
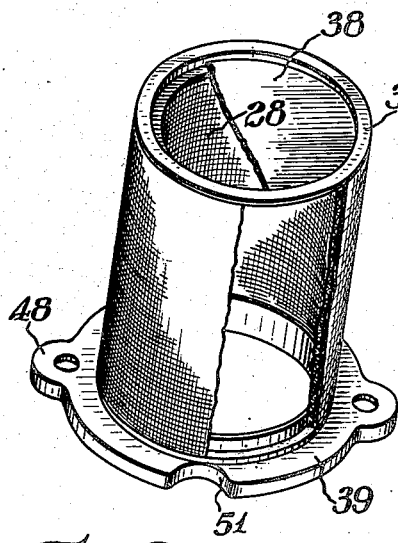
Fig. 8 is a similar view of the inner filtering element.
Figure 10:
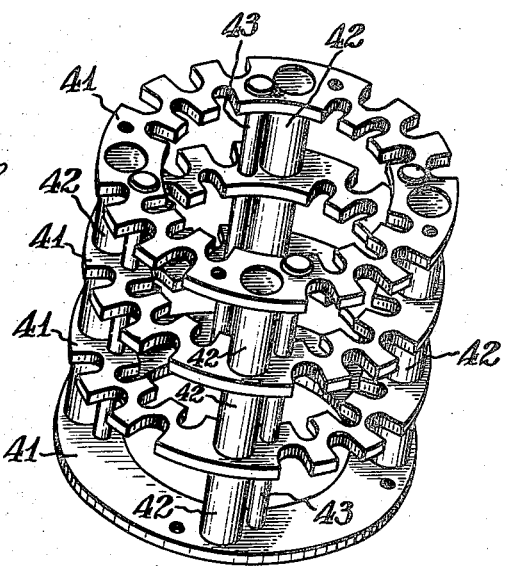
Fig. 10 is a detail in perspective of the magnet and baffle assembly unit.

Referring first to Fig. 1 of the drawings, there is illustrated a casing member 1 providing a chamber 2 having a port 3 in one end thereof and a second port 4 in the side thereof. It will be understood that the ports 3 and 4 are provided with suitable connections to the circulating system for the fluid which is to be purified. Thus, in case the filter unit is utilized for the extraction of ferrous material from the lubricating system of an internal combustion engine, the lubricant is caused to flow through the chamber 2 on its way either to or from the circulating pump of the engine as is customary with ordinary filtering devices.

In the chamber 2 a cylindrical filtering device 5 is mounted comprising a sieve or strainer preferably composed of two layers 6 and 7 of foraminous material of different degrees of fineness, the coarser mesh material being so placed as to support and reenforce the fine mesh material in respect to the pressure of the fluid thereon. Thus if, as illustrated, the flow of fluid is in the direction of the arrows a and flows out through the screen, the coarse mesh material 6 is placed outside the fine mesh screen 7.

The screens 6 and 7 are formed of magnetizable material and a series of baffle plates 8 of magnetizable material are arranged within the filter unit 5 at spaced intervals throughout its length. Between the baffles 8, cylindrical permanent magnets 9 are mounted with like poles in engagement with each baffle as indicated, so that the baffles are magnetized with opposite polarity in sequence.

End mounting collars 11 and 12 are arranged to receive the ends of the screens 6 and 7 and are provided with openings 13 and 14 registering with the openings in the magnets 9, and means in the form of a bolt 15 is provided for traversing said openings and clamping all the parts of the filter into a unitary assembly.

Casing 1 is provided with a shoulder 16 forming a seat for the collar 11 of the filter unit adjacent the port 3, and a plug 17 is arranged to be threaded into an opening 18 in the casing and is provided with a seat 19 to receive the collar 12 of the filter unit.

Collar 11 is provided with a series of openings 21, and the baffle plates 8 are provided with a plurality of serrations or notches 22 permitting fluid to flow through the interior of the filter unit 5.

In the operation of the device, when the filter unit is assembled in the chamber 2 as illustrated, the collars 11 and 12 are tightly held in the seats 16 and 19 so that the liquid coming through the port 3 is forced to enter the filter unit through the openings 21 and emerges through the screens 6 and 7 so as to leave the chamber 2 by means of the port 4. In passing through the filter unit 5, the fluid is forced to flow by the multitude of edges and corners provided by the magnetized baffle plates, and the magnetic material in the fluid adheres to such edges and also to the wires of the screens 6 and 7 which are also magnetized by their engagement with the peripheries of the baffle plates.

When it is desired to clean the filter, it is merely necessary to unscrew the plug 17 and draw out the filter unit. Removal of the bolt 15 then permits disassembly of the unit, and since the parts become demagnetized as soon as the magnets 9 are removed, it is a simple matter to wipe the deposited ferrous material therefrom, with the aid of a solvent such as kerosene or gasoline if desired.

In some cases it is desirable to form the magnets and baffles as a unit which cannot be readily disassembled in the field, in order to prevent the possibility of the magnets being inadvertently reassembled in inverted relation. This may be accomplished, as illustrated, by riveting over the head 20 of the bolt 15, and pressing or swaging on a retaining member such as a washer 30 bearing against the bottom baffle 8 to retain the baffles and magnets assembled, while permitting the removal of the collar 12 and screens 6, 7.

In the embodiment of the invention illustrated in Figs. 4 to 10 inclusive, a more compact arrangement of the filter unit is provided by in effect telescoping it upon itself. As illustrated in Fig. 4, a housing 23 is provided forming a chamber 24 having an end port 25 and a side port 26. The filter unit in this case comprises two concentric screens 27 and 28 preferably of composite structure similar to that employed in the first embodiment of the invention described. The upper end of screen 27 is provided with a reenforcing and sealing ring 29 which is arranged to bear against an upper mounting collar 31. Collar 31 is provided with an upward extension 32 having a sliding fit in an annular shoulder 33 formed in the interior of the casing 23 at the port 25. The lower end of the screen 27 is provided with a mounting ring 34 which is arranged to seat on a shoulder 35 in a lower mounting collar 36 threaded into the lower end of casing 23.

The upper end of screen 28 is also provided with a reenforcing and sealing ring 37, and a disc or plate 38 is mounted in said ring so as to close the upper end of the screen. The lower end of the screen 28 is provided with a mounting ring 39 which is complementary to the mounting ring 34 of screen 27 and cooperates therewith to close at the bottom the annular space between the two screens. Annular baffle plates 41 of magnetizable material having serrations on their inner and outer edges are mounted in the space between the inner and outer screens, and between the baffle plates groups of permanent magnets 42 are mounted with like poles adjacent each baffle plate. The top and bottom baffle plates 41 are permanently tied together by suitable means such as riveted bars 43. The mounting collar 31 is attached to the upper baffle plate 41 by suitable means such as cap screws 44, and the mounting rings 34 and 39 are attached to the lower baffle plate 41 as by means of cap screws 45 and 46 respectively, mating tongues 47 and 48 and depressions 49 and 51 being provided on the rings 34 and 39 respectively for the reception of the cap screws 45, 46.

Suitable packing material 52 is preferably provided between the shoulder 33 of the casing 23 and the mounting collar 31, which packing is placed under compression by the filter unit when the lower collar 36 is tightened up.

In the operation of this embodiment of the invention, assuming that the fluid enters at the port 26 and emerges at the port 25, the fluid enters the filter unit from the outside through the screen 27 and from the inside through the bottom and the screen 28, after which it flows up past the annular baffle plates 41 and emerges from the top of the unit. In flowing through the meshes of the screens and past the multitudinous edges and corners of the baffle plates, the ferrous material in the fluid is extracted by the magnetized parts and the fluid thereby purified.

When the filter unit is to be cleaned, it is merely necessary to remove the lower mounting collar 36, whereupon the filter assembly may be withdrawn. Removal of the cap screws 45 and 46 permits the disassembly of screens 27 and 28 respectively, whereupon the baffle plates may be readily wiped clean and the screens washed and wiped in the usual manner. It is unnecessary to further disassemble the filter unit for cleaning purposes and since the parts can only be assembled in the proper manner, the proper relationship of the magnets and magnetic elements in the filter when reassembled is ensured.

Although but two embodiments of the invention have been shown and described in detail, it will be understood that other embodiments are possible and various changes may be made in the design and arrangements of the parts without departing from the spirit of the invention as defined in the claims appended hereto.

What is claimed is:

1. In a magnetic filter for fluids, a chamber having a fluid port, a cylindrical filter body having a fluid-tight fit in said port and having an axial fluid passage therethrough and a peripheral envelope of foraminous magnetic material, a plurality of magnets arranged longitudinally in the filter body with like poles adjacent, and a plurality of baffles of magnetic material with serrated edges interposed between like poles of said magnets.

2. In a magnetic filter for fluids, a generally cylindrical chamber having an axial fluid port, a cylindrical filter body having a fluid-tight fit in said port and having an axial fluid passage therethrough and a peripheral envelope of foraminous magnetic material, a plurality of permanent magnets arranged longitudinally in the filter body with like poles adjacent, and a plurality of baffle plates of magnetic material interposed between like poles of said magnets with serrated peripheral edges adjacent the envelope.

3. In a magnetic filter for fluids, a generally cylindrical chamber having an axial fluid port, a cylindrical filter body having a fluid-tight fit in said port and having an axial fluid passage therethrough and a peripheral envelope of foraminous magnetic material, a plurality of groups of permanent magnets coaxially arranged with like poles adjacent, and a plurality of magnetic baffle plates with serrated edges interposed between the groups of magnets and extending across the filter body.

4. In a magnetic filter, a cylindrical casing having a port at one end, and a cylindrical filter unit fitting at one end in said port comprising a pair of concentrically arranged filters of magnetic material, a plurality of groups of permanent magnets arranged between the inner and outer filters, with annular magnetic baffles having serrated edges interposed between the like poles thereof, and means for directing the flow of fluid into the spaces between the filters.

5. In a magnetic filter, a cylindrical magnetizable screen, means for directing the flow of a fluid through the screen, a series of circular magnetizable baffle plates in the screen having serrated edges adjacent the screen, and a plurality of permanent bar magnets spacing the baffles with like poles engaging each baffle.

6. In a magnetic filter, a cylindrical magnetizable screen, means for directing the flow of a fluid through the screen, a series of circular magnetizable baffle plates in the screen having serrated edges adjacent the screen, a plurality of permanent bar magnets spacing the baffles with like poles engaging each baffle, and means traversing the baffles for unifying the assembly of magnets and baffles.

7. In a magnetic filter, a pair of concentric cylindrical magnetizable screens, means for directing the flow of a fluid through said screens and the annular chamber therebetween, a plurality of magnetizable annular baffles located at spaced intervals within said chamber, and permanent magnets arranged axially within said chamber between the baffles, with like poles engaging said baffles.

8. In a magnetic filter, a pair of concentric cylindrical magnetizable screens, means for directing the flow of a fluid through said screens and the annular chamber therebetween, a plurality of magnetizable annular baffles with serrated edges located at spaced intervals within said chamber, permanent bar magnets arranged in parallel between the baffles, and means for rigidly attaching the magnets and baffles to form a unitary assembly.

9. In a magnetic filtering device for fluids, a cylindrical chamber having an end port and a side port, a pair of concentric cylindrical magnetizable screens in the chamber, means for connecting the end port to the annular space between the screens, means for connecting the side port to the spaces outside the outer screen and inside the inner screen, a partition closing the end of the space between the screens opposite the end port, magnetizable baffles in said space, and permanent magnets spacing said baffles with like poles engaging each baffle.

10. In a magnetic filtering device for fluids, a cylindrical chamber having an end port and a side port, a pair of concentric cylindrical magnetizable screens in the chamber, means for connecting the end port to the annular space between the screens, means for connecting the side port to the spaces outside the outer screen and inside the inner screen, a partition closing the end of the space between the screens opposite the end port, annular magnetizable baffles in said space having serrated edges adjacent said screen, permanent bar magnets spacing said baffles with like poles engaging each baffle, and means traversing the baffles for unifying the assembly of baffles and magnets.

JAKOB RUDOLF FREI.